(12) United States Patent
Kagohashi et al.

(10) Patent No.: US 11,424,452 B2
(45) Date of Patent: Aug. 23, 2022

(54) LEAD-ACID BATTERY

(71) Applicant: GS Yuasa International Ltd., Kyoto (JP)

(72) Inventors: Hiroki Kagohashi, Kyoto (JP); Ikumi Motoi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 519 days.

(21) Appl. No.: 16/336,932

(22) PCT Filed: Sep. 15, 2017

(86) PCT No.: PCT/JP2017/033503
§ 371 (c)(1),
(2) Date: Mar. 27, 2019

(87) PCT Pub. No.: WO2018/061832
PCT Pub. Date: Apr. 5, 2018

(65) Prior Publication Data
US 2019/0267629 A1   Aug. 29, 2019

(30) Foreign Application Priority Data

Sep. 30, 2016   (JP) .............................. JP2016-193616

(51) Int. Cl.
*H01M 4/62* (2006.01)
*H01M 4/14* (2006.01)
*H01M 10/06* (2006.01)
*H01M 4/02* (2006.01)

(52) U.S. Cl.
CPC ............. *H01M 4/627* (2013.01); *H01M 4/14* (2013.01); *H01M 4/62* (2013.01); *H01M 10/06* (2013.01); *H01M 2004/027* (2013.01)

(58) Field of Classification Search
None
See application file for complete search history.

(56) References Cited

U.S. PATENT DOCUMENTS

| | | |
|---|---|---|
| 2013/0022860 A1 | 1/2013 | Minoura et al. |
| 2014/0134482 A1 | 5/2014 | Okamoto |
| 2015/0050540 A1 | 2/2015 | Toduka et al. |
| 2017/0025681 A1 | 1/2017 | Motoi |
| 2017/0092934 A1 | 3/2017 | Hamano |

FOREIGN PATENT DOCUMENTS

| | | |
|---|---|---|
| CN | 101719420 A | 6/2010 |
| CN | 201663203 U | 12/2010 |
| CN | 103534864 A | 1/2014 |

(Continued)

OTHER PUBLICATIONS

Shin Kobe Electric Machinery Co. Ltd. (WO 2012017702) (Detailed Description) (Oct. 3, 2013) (Year: 2013).*

(Continued)

*Primary Examiner* — Carmen V Lyles-Irving
(74) *Attorney, Agent, or Firm* — Rankin, Hill & Clark LLP

(57) ABSTRACT

The organic expander in a negative electrode material of a lead-acid battery contains an S polymer having an aromatic ring and an L polymer having an aromatic ring, and a mass MS1 of the S polymer and a mass ML1 of the L polymer satisfy $0.05 \leq ML1/(ML1+MS1) \leq 0.15$.

6 Claims, 7 Drawing Sheets

(56) References Cited

FOREIGN PATENT DOCUMENTS

| | | |
|---|---|---|
| CN | 104592529 A | 5/2015 |
| CN | 104681879 A | 6/2015 |
| CN | 105794037 A | 7/2016 |
| CN | 105810927 A | 7/2016 |
| JP | H0465062 A | 3/1992 |
| JP | H05225999 A | 9/1993 |
| JP | H08162116 A | 6/1996 |
| JP | H0982317 A | 3/1997 |
| JP | H09293514 A | 11/1997 |
| JP | H10106576 A | 4/1998 |
| JP | H10125329 A | 5/1998 |
| JP | H11121008 A | 4/1999 |
| JP | H11250913 A | 9/1999 |
| JP | 2008152955 A | 7/2008 |
| JP | 2008177157 A | 7/2008 |
| JP | 2015088379 A | 5/2015 |
| JP | 2016173911 A | 9/2016 |
| KR | 20120010873 A | 2/2012 |
| WO | 2012017702 A1 | 2/2012 |
| WO | 2013005733 A1 | 1/2013 |
| WO | 2013046499 A1 | 4/2013 |
| WO | 2015181865 A1 | 12/2015 |

OTHER PUBLICATIONS

Shin Kobe Electric Machinery Co. Ltd. (WO 2012017702) (Abstract) (Oct. 3, 2013) (Year: 2013).*
International Search Report dated Dec. 19, 2017 filed in PCT/JP2017/033503.

* cited by examiner

LEAD-ACID BATTERY

TECHNICAL FIELD

The present invention relates to a lead-acid battery.

BACKGROUND ART

For a lead-acid battery for automobile or the like, in order to ensure the starting performance over a long period of time, the retention ratio of a low-temperature high-rate capacity is important.

Relevant prior arts will be described. Patent Document 1 (WO 2013/005733) discloses that a low-temperature high-rate capacity can be increased by containing a bisphenol condensate and lignin sulfonic acid in a negative electrode material. Further, with respect to the relationship between the mass of the bisphenols sulfonic acid and the mass of the lignin sulfonic acid, the lignin sulfonic acid/(lignin sulfonic acid+bisphenol condensate) is 0.16 or more.

Patent Document 2 (WO 2012/017702) discloses that the initial value of a low-temperature high-rate capacity can be increased by containing lignin sulfonic acid in a proportion of 20 mass % or more and bisphenols sulfonic acid in a proportion of 80 mass % or less in a negative electrode expander. Patent Documents 1 and 2 do not describe the retention ratio of a low-temperature high-rate capacity.

PRIOR ART DOCUMENTS

Patent Documents

Patent Document 1: WO 2013/005733
Patent Document 2: WO 2012/017702

SUMMARY OF THE INVENTION

Problems to be Solved by the Invention

For a lead-acid battery for automobile or the like, in order to ensure the starting performance, a low-temperature high-rate capacity is required. In this regard, an initial low-temperature high-rate capacity has been improved by adding an organic expander. In addition, in order to ensure the starting performance over a long period of time, the retention ratio of a low-temperature high-rate capacity has been regarded as important. Further, the inventors have investigated the relationship between the organic expander and the retention ratio of a low-temperature high-rate capacity, and thus have completed the present invention. It is technically significant that it has become possible to retain the low-temperature high-rate capacity for a long period of time.

An object of the present invention is to improve a retention ratio of a low-temperature high-rate capacity in a lead-acid battery.

Means for Solving the Problems

One aspect of the present invention is a lead-acid battery including a negative electrode material containing an organic expander, in a negative electrode plate, in which the organic expander contains an S polymer having an aromatic ring and having an S element content of 3000 μmol/g or more and an L polymer having an aromatic ring and having an S element content of 2000 μmol/g or less, and a mass MS1 of the S polymer and a mass ML1 of the L polymer satisfy $$0.05 \leq ML1/(ML1+MS1) \leq 0.15.$$

One aspect of the present invention is a lead-acid battery, in which a mass ML1 of a L polymer and a mass MS1 of a S polymer, which are measured from a negative electrode plate of the lead-acid battery by the following procedures, satisfy $0.05 \leq ML1/(ML1+MS1) \leq 0.15$.

Procedures: after fully charged, insoluble components are removed by filtration from a solution obtained by immersing and dissolving a negative electrode material separated from a negative electrode plate from which sulfuric acid components have been removed by water washing in a 1 mol/L NaOH aqueous solution at 40° C. for 48 hours, the solution is passed through a column and desalted, and the desalted solution is fractionated, an absorbance A350 at a wavelength of 350 nm and an absorbance A300 at a wavelength of 300 nm of each of fractionated components are measured, and $ML1$=(total mass of fractionated components of $A350/A300>0.5$), and $MS1$=(total mass of fractionated components of $A350/A300 \leq 0.5$) are set.

MODE FOR CARRYING OUT THE INVENTION

Figure 1:
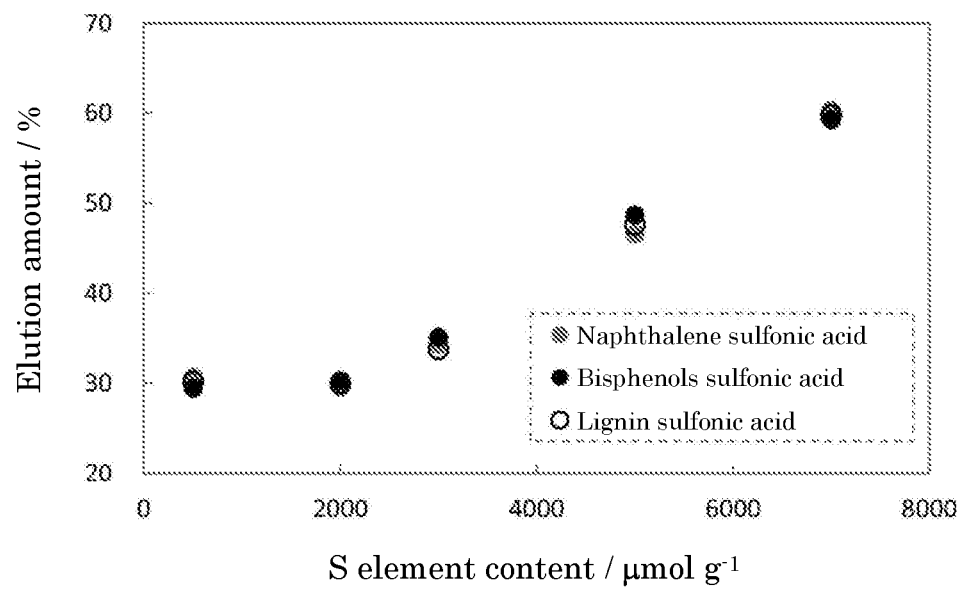
FIG. 1 is a characteristic chart showing the relationship between the S element content of an organic expander and the elution amount when three kinds of organic expanders each are contained alone.

One aspect of the present invention is a lead-acid battery including a negative electrode material containing an organic expander, in a negative electrode plate, in which the organic shrink-proofing agent contains an S polymer having an aromatic ring and having an S element content of 3000 μmol/g or more and an L polymer having an aromatic ring and having an S element content of 2000 μmol/g or less, and a mass MS1 of the S polymer and a mass ML1 of the L polymer satisfy $$0.05 \leq ML1/(ML1+MS1) \leq 0.15.$$

One aspect of the present invention is a lead-acid battery, in which a mass ML1 of a L polymer and a mass MS1 of a S polymer, which are measured from a negative electrode plate of the lead-acid battery by the following procedures, satisfy $0.05 \leq ML1/(ML1+MS1) \leq 0.15$.

Procedures: after fully charged, insoluble components are removed by filtration from a solution obtained by immersing and dissolving a negative electrode material separated from a negative electrode plate from which sulfuric acid components have been removed by water washing in a 1 mol/L NaOH aqueous solution at 40° C. for 48 hours, the solution is passed through a column and desalted, and the desalted solution is fractionated, an absorbance A350 at a wavelength of 350 nm and an absorbance A300 at a wavelength of 300 nm of each of fractionated components are measured, and $ML1$=(total mass of fractionated components of $A350/A300>0.5$), and $MS1$=(total mass of fractionated components of $A350/A300 \leq 0.5$) are set.

In this way, the retention ratio of a low-temperature high-rate capacity can be improved.

When the ratio of the mass of an L polymer and the total mass of an S polymer and the L polymer is 0.05 or more and 0.15 or less, the retention ratio of a low-temperature high-rate capacity can be increased. It is noteworthy that this property does not develop when the mass ratio is set to 0.2 or more, and that a small amount of the L polymer in an organic expander contributes to the retention ratio of a low-temperature high-rate capacity.

In this regard, the S element content of the S polymer may also be set to 3000 μmol/g or more. According to this one aspect, the retention ratio of a low-temperature high-rate capacity can be improved, and therefore, this is preferred.

In this regard, the S element content of the S polymer may also be set to 6000 μmol/g or less. According to this one aspect, the elution of an organic expander can be suppressed, and therefore, this is preferred.

In this regard, the S element content of the S polymer may also be set to 4000 μmol/g or more and 6000 μmol/g or less. According to this one aspect, the low-temperature high-rate capacity can be retained particularly high, and the elution of an organic expander can be suppressed, and therefore, this is preferred.

In this regard, the density of a negative electrode material may also be set to 3.8 g/cm$^3$ or more. According to this one aspect, the elution of an organic expander can be suppressed, and therefore, this is preferred.

In this regard, the density of a negative electrode material may also be set to 4.0 g/cm$^3$ or more. According to this one aspect, the elution of a negative electrode material can be further suppressed, and therefore, this is preferred.

<Term and Unit>

In Examples, the condensate of bisphenols sulfonic acid is simply referred to as bisphenols sulfonic acid. Similarly, the condensate of naphthalene sulfonic acid is simply referred to as naphthalene sulfonic acid. The L polymer is an organic expander having an S element content of 2000 μmol/g or less, and the S polymer is an organic expander having an S element content of 3000 μmol/g or more. The organic expander is used in the meaning of all of the organic expanders including both of an S polymer and an L polymer. In addition, when the content of a substance is expressed in "%", the "%" means mass %.

<Determination Method of L Polymer and S Polymer>

The lead-acid battery fully charged is decomposed, a negative electrode plate is taken out and subjected to water washing to remove sulfuric acid components, and the resultant negative electrode plate is dried. An electrode material (active material) with a predetermined mass M is collected from the negative electrode plate, and the active material is immersed in a 1 mol/L NaOH aqueous solution at 40° C. for 48 hours to extract an organic expander, and a solution from which insoluble components have been removed by filtration is obtained. This solution is desalted and fractionated by gel column chromatography or the like of which the column yield "y" has been measured.

For the fractionation, a column having a height of 30 cm and an inner diameter of 7.8 mm is used, the flow rate is set to 1.0 ml/min, and the fractionation is performed in 3-ml portions.

For each of fractionated components, the ultraviolet visible absorption spectrum is measured with an ultraviolet visible absorption spectrometer, and the absorbance A 350 at 350 nm corresponding to a carboxyl group or the like and the absorbance A 300 at 300 nm corresponding to a sulfonic acid group or the like are measured. Further, each of fractionated components is concentrated and dried to obtain a powder sample, and the mass of the powder sample for each of the components is measured. Subsequently, the mass ML1 of an L polymer and the mass MS1 of an S polymer are determined by the following equation.

$ML1$=(total mass of fractionated components of $A350/A300>0.5$)   1)

$MS1$=(total mass of fractionated components of $A350/A300 \leq 0.5$)   2)

The concentration of the L polymer and the concentration of the S polymer in the negative active material are determined by ML1/(M×y) and MS1/(M×y), respectively.

<Measurement Method of S Element Content>

The S element in 0.1 g of each of fractionated components is converted into sulfuric acid by an oxygen combustion flask method, and the eluate is titrated with barium perchlorate by using trin as an indicator to determine the S element content of each of the components. When the concentration of the barium perchlorate aqueous solution is taken as C ($\mu$mol $L^{-1}$) and the titration amount is taken as V (L), the S element content Ws ($\mu$mol $g^{-1}$) is Ws=CV/0.1.

<Measurement Method of Density of Negative Active Material>

The density of a negative electrode material means the value of a bulk density of the negative electrode material after formation, and is measured as follows.

The battery after formation is fully charged, and then the fully-charged battery is disassembled to obtain a negative electrode plate.

The obtained negative electrode plate is subjected to water washing and drying to remove the electrolyte solution in the negative electrode plate.

Next, the negative electrode material is separated from the negative electrode plate to obtain an unpulverized measurement sample.

The sample is put into a measurement case, the measurement case is evacuated, and then filled with mercury at a pressure of 0.5 to 0.55 psia, the bulk density of the negative electrode material is measured, and the mass of the measurement sample is divided by the bulk density to determine the bulk density of the negative electrode material.

In this regard, the volume obtained by subtracting the injection volume of the mercury from the volume of the measurement case is taken as the bulk volume.

The auxiliary charging conditions to obtain a fully-charged state are as follows.

(1) In a case of a flooded-type battery, the constant current charge is performed until the battery reaches 2.5 V/cell at 0.2 CA in a water tank at 25° C., and then the constant current charge is performed at 0.2 CA for 2 more hours.

(2) In a case of a VRLA battery (valve regulated lead-acid battery), the constant current constant voltage charge of 2.23 V/cell at 0.2 CA in an air tank at 25° C. is performed, and the charging is terminated at the time point when the charge current during the constant voltage charge reached 1 mCA or less.

<Measurement Method of Characteristics of Lead-Acid Battery>

Low-temperature high-rate capacity: the low-temperature high-rate capacity is measured by taking the time until the terminal voltage is lowered to 6.0 V as a low temperature high rate discharge duration time when the battery is discharged at 6.25 CA in an air tank at −15° C. Herein, 1 CA is constant regardless of the lead-acid battery, when a 5-hour rate capacity of a lead-acid battery (standard battery) in which 0.2 mass % of lignin sulfonic acid having an S element content of 500 $\mu$mol/g is contained but an S polymer is not contained in the negative active material is taken as the capacity of the standard. The results are shown as relative values by taking the value in the standard battery as 100.

Initial 5-hour rate capacity: a cycle of discharging a lead-acid battery at 0.2 CA to obtain a final voltage of 10.5 V and charging the lead-acid battery at 0.2 CA up to a capacity 1.3 times the discharge capacity is performed three times at 25° C., and the average discharge capacity of three cycles is taken as the initial 5-hour rate capacity. The results are shown as relative values by taking the value in the standard battery as 100.

The number of life cycles: the number of life cycles is determined by an idling stop life test prescribed in SBA S0101: 2014.

Falling amount of positive electrode material (active material): the lead-acid battery after experiencing 30000 cycles of idling stop life test is fully charged, and the falling amount of is measured from the mass of the positive electrode material (active material) in the positive electrode plate.

Elution amount of organic expander: the lead-acid battery after experiencing 30000 cycles of idling stop life test is subjected to the measurement of the L polymer content and the S polymer content, and the organic expander concentration C1 (C1=(ML+MS)/M) is determined. By using the original organic expander concentration C2 ((C2=(ML+MS)/M), 1−C1/C2 is taken as the elution amount of the organic expander. Note that ML represents the mass of the L polymer and MS represents the mass of the S polymer.

Retention ratio of low-temperature high-rate capacity: the lead-acid battery after experiencing the high temperature overcharge for 10 days at a test temperature of 60° C. and a charging current of 0.05 CA is subjected to the measurement of the low-temperature high-rate capacity, and the ratio of the obtained low-temperature high-rate capacity to the initial low-temperature high-rate capacity is taken as the retention ratio.

<Production Example of Lead-Acid Battery>

As the S polymer, a bisphenols sulfonic acid formaldehyde condensate, a naphthalene sulfonic acid formaldehyde condensate, and lignin sulfonic acid in which the content of sulfonic acid is increased as compared with that of a conventional method are used. A mixture of these S polymers may be used. As the S element, a sulfonyl group or the like in addition to the sulfonic acid group may be contained, and the existence form of the S element is arbitrary. Further, the kind of the organic polymer to be a base material of the S polymer is arbitrary.

The kind of bisphenol may be any of A type, F type and S type. In a case of bisphenol sulfonic acid and also in a case of naphthalene sulfonic acid, the condensing agent is, for example, formaldehyde, but the kind of the condensing agent is arbitrary. In addition, the sulfonic acid group may be directly bonded to a phenyl group of bisphenol or a naphthalene group of naphthalene sulfonic acid, or may be bonded to a phenyl group, a naphthalene group, an alkyl group or the like, which is different from the skeleton.

By using lignin sulfonic acid having an ordinary S element content as the L polymer, the sulfonation condition is controlled to change the S element content in the battery after formation. The kind of the organic polymer to be a base material of the L polymer is arbitrary. The S polymer and the L polymer are mixed to form an organic expander, but the S polymer and the L polymer may be separately mixed with lead powder.

Hereinafter, the optimum examples of the invention of the present application will be described. In performing the invention of the present application, the examples can be appropriately changed in accordance with the common knowledge of those skilled in the art and with the disclosure of the prior art. Note that in examples, the negative electrode material may be referred to as a negative active material, and the positive electrode material may be referred to as a positive active material. In addition, the negative electrode plate includes a negative electrode current collector (negative electrode grid) and a negative electrode material (negative active material), the positive electrode plate includes a positive electrode current collector (positive electrode grid) and a positive electrode material (positive active material), and solid components other than the current collector belong to the electrode material.

Lead powder, an organic expander, carbon, barium sulfate, and a synthetic fiber reinforcing material were mixed with water and sulfuric acid to prepare a negative active material paste. Relative to the negative active material after formation (strictly, the negative electrode material), 1 mass % of barium sulfate, 0.2 mass % of carbon, and 0.1 mass % of a synthetic fiber reinforcing material were contained. With respect to the preferable content range of these components, the barium sulfate was in the range of 0.2 mass % or more and 2.0 mass % or less, the carbon was in the range of 0.05 mass % or more and 3.0 mass % or less, and the synthetic fiber reinforcing material was in the range of 0.05 mass % or more and 0.2 mass % or less. The negative active material paste was filled in a negative electrode grid made of a Pb—Ca—Sn based alloy, and was aged and dried to obtain an unformed negative electrode plate. The kind of lead powder, the production conditions, the type of the grid, and the like are arbitrary, and the negative active material may contain components other than the components described above.

Lead powder, and a synthetic fiber reinforcing material (0.1 mass % relative to the formed positive active material) were mixed with water and sulfuric acid to prepare a positive active material paste. This paste was filled in a positive electrode grid made of a Pb—Ca—Sn based alloy, and was aged and dried to obtain an unformed positive electrode plate.

An unformed negative electrode plate was housed in a bag-shaped separator made of microporous polyethylene, five unformed positive electrode plates and six unformed negative electrode plates per cell were placed in a container so as to be opposed to each other, an electrolyte solution was added to perform container formation, and a flooded-type lead-acid battery with 12 V power was prepared. The density of the negative active material after formation was changed in the range of 3.0 g/cm$^3$ to 5.0 g/cm$^3$. The lead-acid battery may be a valve regulated battery, and a spine made of a Pb based alloy or the like in place of the grid may be used as the current collector of the positive electrode. After formation, the concentration of each of the L polymer and the S polymer in the active material was determined by the method described above. Further, the S element content in each of the L polymer and the S polymer was measured by the method described above. The density of the negative electrode material was measured by the method described above using an automatic porosimeter, AutoPore IV 9505 manufactured by Shimadzu Corporation.

The formation can be performed by charging an element with electricity in a state that the element including an unformed negative electrode plate is immersed in an electrolyte solution including sulfuric acid in a container of a lead-acid battery. In this regard, the formation treatment may be performed before assembling the lead-acid battery or the element.

<Relationship Between the S Element Content and the Elution Amount of Organic Expander in Organic Expander not Containing L Polymer>

The relationship between the S element content of an organic expander and the elution amount was determined by changing the S element content with the use of one kind of organic expander instead of mixing the L polymer and the S polymer. The results are shown in Table 1 and FIG. 1, the content of the organic expander was fixed to 0.2 mass %, and the active material density was fixed to 3.5 g/cm$^3$. Even when the base material of the expander was changed, the tendency was the same, and when the S element content exceeded 2000 μmol/g, the elution amount was increased.

TABLE 1

Relationship between S element content and elution amount (not mixture with multiple organic expanders)

| Results of each measurement | Organic polymer species | | | | | | | |
|---|---|---|---|---|---|---|---|---|
| | Lignin sulfonic acid | | | | | Bisphenols sulfonic acid | | |
| S element content/ μmol g$^{-1}$ | 500 | 2000 | 3000 | 5000 | 7000 | 500 | 2000 | 3000 |
| Organic expander content/% | 0.2 | ← | ← | ← | ← | ← | ← | ← |
| Active material density/g cm$^{-3}$ | 3.5 | ← | ← | ← | ← | ← | ← | ← |
| Elution amount/% | 30.2 | 30.0 | 33.8 | 47.6 | 59.8 | 29.5 | 30.3 | 35.1 |

| Results of each measurement | Organic polymer species | | | | | | |
|---|---|---|---|---|---|---|---|
| | Bisphenols sulfonic acid | | Naphthalene sulfonic acid | | | | |
| S element content/ μmol g$^{-1}$ | 5000 | 7000 | 500 | 2000 | 3000 | 5000 | 7000 |
| Organic expander content/% | ← | ← | ← | ← | ← | ← | ← |
| Active material density/g cm$^{-3}$ | ← | ← | ← | ← | ← | ← | ← |
| Elution amount/% | 48.7 | 59.3 | 30.7 | 29.6 | 34.3 | 46.6 | 60.3 |

<Relationship Between the L Polymer Content and the Elution Amount in Organic Expander Containing L Polymer and S Polymer>

Figure 2:
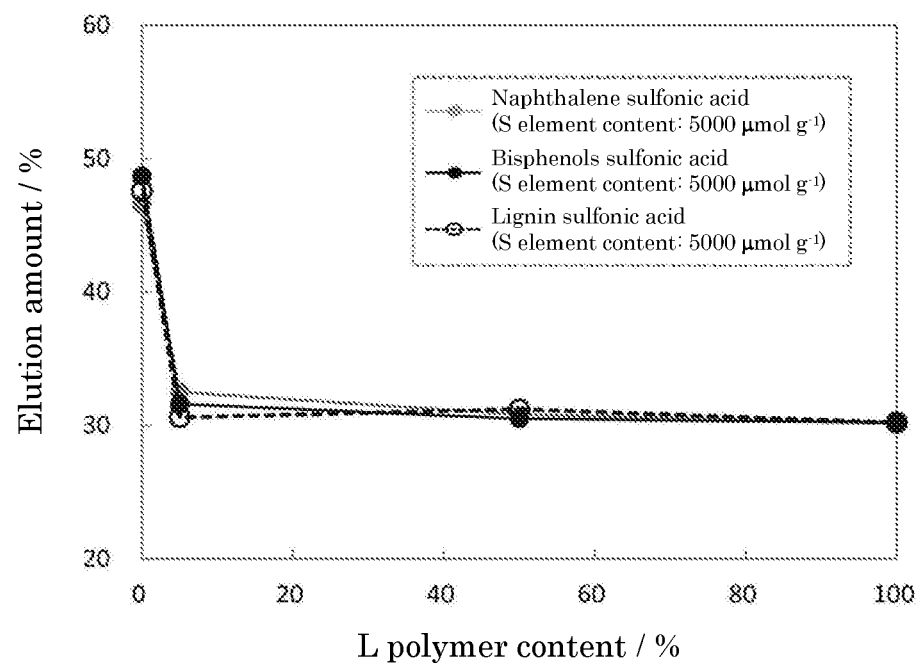
FIG. 2 is a characteristic chart showing the relationship between the L polymer content and the elution amount of an organic expander when the content of the organic expander is fixed.

When the S element content of the S polymer was fixed to 5000 μmol/g, the S element content of the L polymer was fixed to 500 μmol/g, the content of the organic expander was fixed to 0.2 mass %, the active material density was fixed to 3.5 g/cm$^3$, and the content of the L polymer in the organic expander was changed, the elution amount of each of the organic expanders was shown in Table 2 and FIG. 2. By setting the L polymer content to 5 mass % or more, the elution amount was decreased.

TABLE 2

Relationship between the L polymer content and the elution amount of organic expander (all of the contents of organic expanders were fixed)

| Results of each measurement | S polymer species | | | | | | | | | | | |
|---|---|---|---|---|---|---|---|---|---|---|---|---|
| | Lignin sulfonic acid | | | | Bisphenols sulfonic acid | | | | Naphthalene sulfonic acid | | | |
| S element content of S polymer/μmol g$^{-1}$ | 5000 | ← | ← | ← | ← | ← | ← | ← | ← | ← | ← | ← |
| Organic expander content/% | 0.2 | ← | ← | ← | ← | ← | ← | ← | ← | ← | ← | ← |
| S element content of L polymer/μmol g$^{-1}$ | 500 | ← | ← | ← | ← | ← | ← | ← | ← | ← | ← | ← |
| Active material density/g cm$^{-3}$ | 3.5 | ← | ← | ← | ← | ← | ← | ← | ← | ← | ← | ← |
| Content of L polymer in mixed organic expander/% | 0 | 5 | 50 | 100 | 0 | 5 | 50 | 100 | 0 | 5 | 50 | 100 |
| Elution amount/% | 47.6 | 30.6 | 31.2 | 30.2 | 48.7 | 31.6 | 30.5 | 30.2 | 46.6 | 32.5 | 30.8 | 30.2 |

Figure 3:
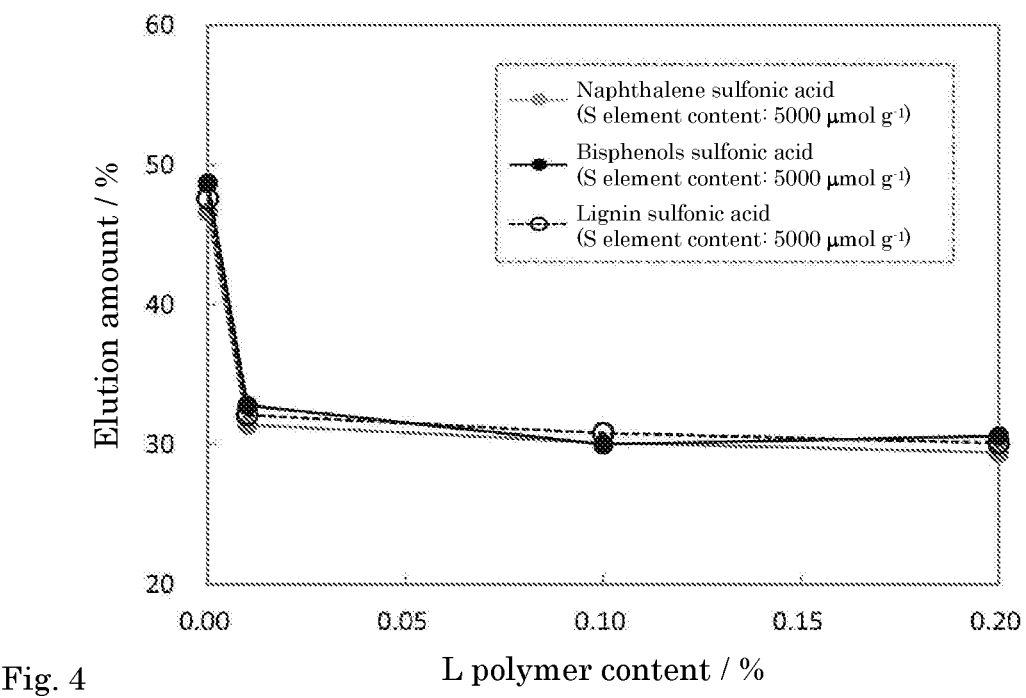
FIG. 3 is a characteristic chart showing the relationship between the L polymer content and the elution amount of an organic expander when the content of the S polymer is fixed.

For confirmation, the elution amount of the organic expander was measured by fixing the S polymer content to 0.2 mass % and changing the L polymer content. The results are shown in Table 3 and FIG. 3. In this case, the elution amount was also decreased by setting the L polymer content to 5 mass % or more. Even when the base material of the S polymer was changed, and the content of the S polymer was fixed or the total amount of the organic expanders was fixed or changed, it was unchanged that the L polymer content was 5 mass % or more, and the elution amount was decreased.

<Relationship Between the S Element Content of L Polymer and the Elution Amount of Organic Expander>

Figure 4:
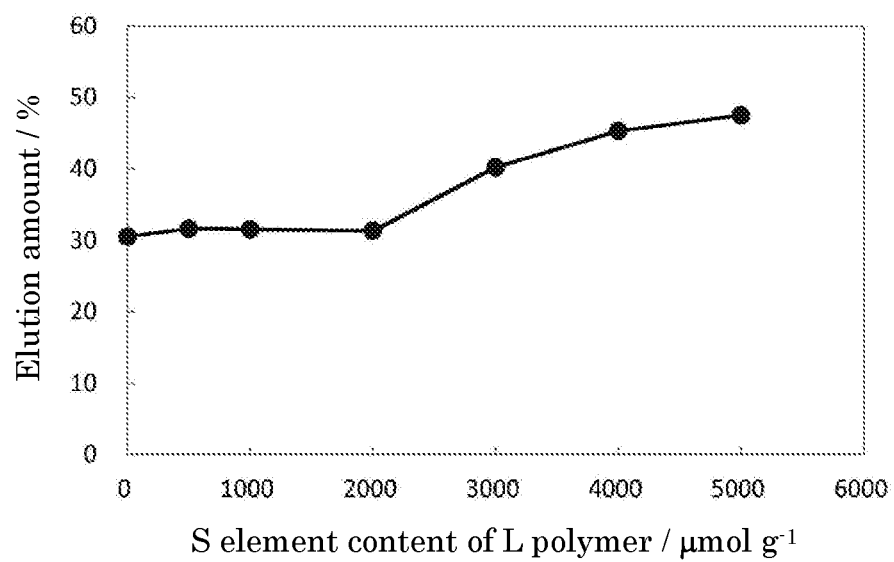
FIG. 4 is a characteristic chart showing the relationship between the S element content of an L polymer and the elution amount of an organic expander when the L polymer is contained in an amount of 5 mass % relative to the organic expander.

The S element content of the S polymer was fixed to 5000 μmol/g, the content of the organic expander in the negative active material was fixed to 0.2 mass %, the active material density was fixed to 3.5 g/cm$^3$, and the content of the L polymer in the organic expander was fixed to 5 mass %. The elution amount of the organic expander was shown in Table 4 and FIG. 4 when the S element content of the L polymer was changed. When the S element content of the L polymer was 2000 μmol/g or less, the elution amount was decreased.

TABLE 3

Relationship between the L polymer addition amount and the elution amount of all of organic expanders (S polymer content was fixed)

| Results of each measurement | S polymer species | | | | | | | | | | | |
|---|---|---|---|---|---|---|---|---|---|---|---|---|
| | Lignin sulfonic acid | | | | Bisphenols sulfonic acid | | | | Naphthalene sulfonic acid | | | |
| S element content of S polymer/μmol g$^{-1}$ | 5000 | ← | ← | ← | ← | ← | ← | ← | ← | ← | ← | ← |
| S polymer content/% | 0.2 | ← | ← | ← | ← | ← | ← | ← | ← | ← | ← | ← |
| S element content of L polymer/μmol g$^{-1}$ | 500 | ← | ← | ← | ← | ← | ← | ← | ← | ← | ← | ← |
| Active material density/g cm$^{-3}$ | 3.5 | ← | ← | ← | ← | ← | ← | ← | ← | ← | ← | ← |
| L polymer content/% | 0.00 | 0.01 | 0.10 | 0.20 | 0.00 | 0.01 | 0.10 | 0.20 | 0.00 | 0.01 | 0.10 | 0.20 |
| Elution amount/% | 47.6 | 32.1 | 30.8 | 30.1 | 48.7 | 32.8 | 30.0 | 30.6 | 46.6 | 31.4 | 30.1 | 29.4 |

TABLE 4

Relationship between the S element content of L polymer and the elution amount of organic expander (content of L polymer was 5%)

| Results of each measurement | S polymer species Bisphenols sulfonic acid | | | | | | |
|---|---|---|---|---|---|---|---|
| S element content of S polymer/μmol g$^{-1}$ | 5000 | ← | ← | ← | ← | ← | ← |
| Organic expander content/% | 0.2 | ← | ← | ← | ← | ← | ← |
| Active material density/ g cm$^{-3}$ | 3.5 | ← | ← | ← | ← | ← | ← |
| S element content of L polymer/μmol g$^{-1}$ | 0 | 500 | 1000 | 2000 | 3000 | 4000 | 5000 |
| Content of L polymer in mixed organic expander/% | 5 | ← | ← | ← | ← | ← | ← |
| Elution amount/% | 30.5 | 31.6 | 31.5 | 31.3 | 40.2 | 45.3 | 47.5 |

<Relationship Between the S Element Content of S Polymer and the Elution Amount of Organic Expander>

Figure 5:
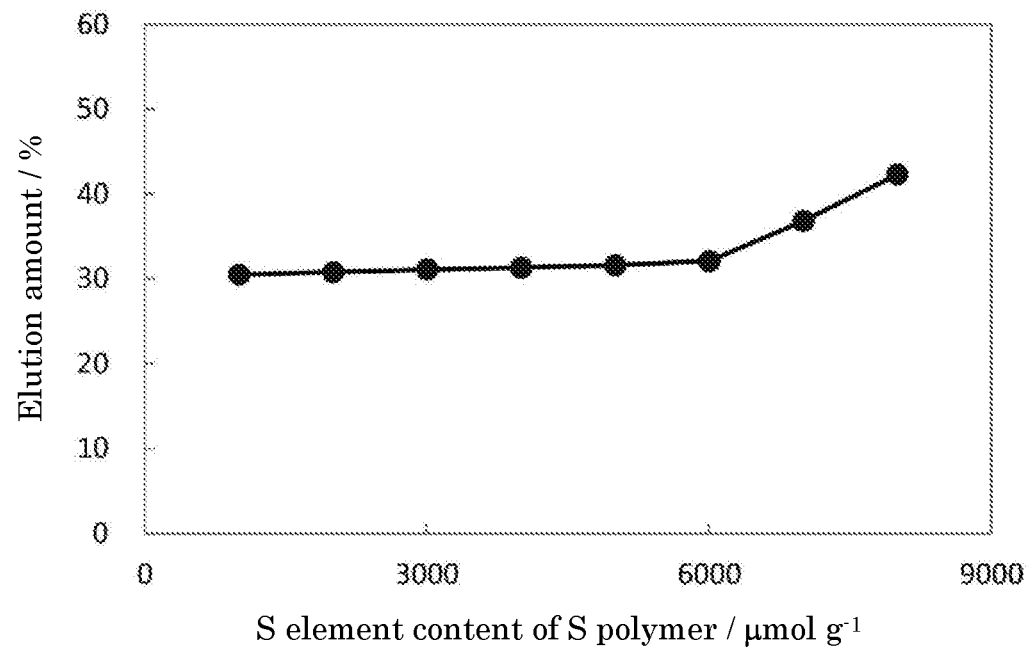
FIG. 5 is a characteristic chart showing the relationship between the S element content of an S polymer and the elution amount of an organic expander when the L polymer is contained in an amount of 5 mass % relative to the organic expander.

When the content of the organic expander was fixed to 0.2 mass %, the S element content of the L polymer was fixed to 500 μmol/g, the active material density was fixed to 3.5 g/cm$^3$, and the content of the L polymer in the organic expander was fixed to 5 mass %, and the S element content of the S polymer was changed, the elution amount of the organic expander was shown in Table 5 and FIG. 5. When the S element content of the S polymer exceeds 6000 μmol/g, the elution amount was increased.

TABLE 5

Relationship between the S element content of S polymer and the elution amount of organic expander (content of L polymer was 5%)

| Results of each measurement | S polymer species Bisphenols sulfonic acid | | | | | | | |
|---|---|---|---|---|---|---|---|---|
| S element content of S polymer/μmol g$^{-1}$ | 1000 | 2000 | 3000 | 4000 | 5000 | 6000 | 7000 | 8000 |
| Organic expander content/% | 0.2 | ← | ← | ← | ← | ← | ← | ← |
| S element content of L polymer/μmol g$^{-1}$ | 500 | ← | ← | ← | ← | ← | ← | ← |
| Active material density/ g cm$^{-3}$ | 3.5 | ← | ← | ← | ← | ← | ← | ← |
| Content of L polymer in mixed organic expander/% | 5 | ← | ← | ← | ← | ← | ← | ← |
| Elution amount/% | 30.5 | 30.8 | 31.1 | 31.3 | 31.6 | 32.1 | 36.8 | 42.3 |

<Relationship Between the Content of Organic Expander and the Elution Amount of Organic Expander>

Figure 6:
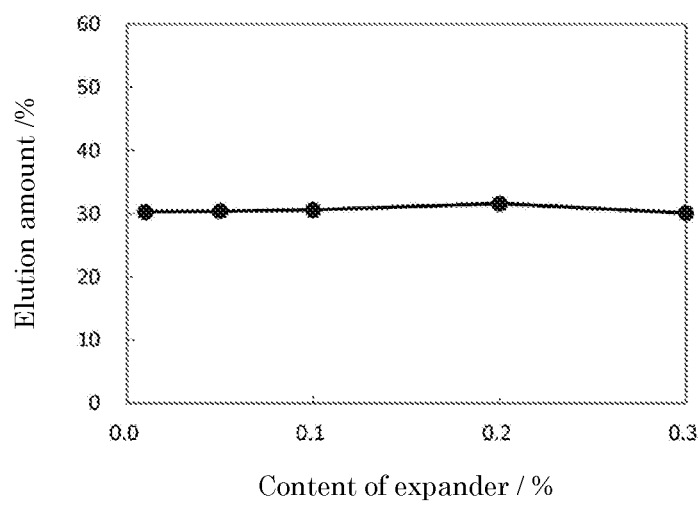
FIG. 6 is a characteristic chart showing the relationship between the content of an organic expander and the elution amount of the organic expander.

When the S element content of the S polymer was fixed to 5000 μmol/g, the S element content of the L polymer was fixed to 500 μmol/g, the content of the L polymer in the organic expander was fixed to 5 mass %, the active material density was fixed to 3.5 g/cm$^3$, and the content of the organic expander was changed, the elution amount of the organic expander was shown in Table 6 and FIG. 6. When the content of the organic expander was in the range of 0.3 mass % or less, the elution amount was substantially constant. According to this, the content of the organic expander is preferably 0.5 mass % or less, more preferably 0.01 mass % or more and 0.5 mass % or less, and particularly preferably 0.1 mass % or more and 0.5 mass % or less.

TABLE 6

Relationship between the content of organic expander and the elution amount

| Results of each measurement | S polymer species Bisphenols sulfonic acid | | | | |
|---|---|---|---|---|---|
| S element content of S polymer/μmol g$^{-1}$ | 5000 | ← | ← | ← | ← |
| Organic expander content/% | 0.01 | 0.05 | 0.10 | 0.20 | 0.30 |
| S element content of L polymer/μmol g$^{-1}$ | 500 | ← | ← | ← | ← |
| Active material density/g cm$^{-3}$ | 3.5 | ← | ← | ← | ← |

TABLE 6-continued

Relationship between the content of organic expander and the elution amount

| Results of each measurement | S polymer species Bisphenols sulfonic acid | | | | |
|---|---|---|---|---|---|
| Content of L polymer in mixed organic expander/% | 5 | ← | ← | ← | ← |
| Elution amount/% | 30.3 | 30.4 | 30.6 | 31.6 | 30.1 |

<Relationship Between the S Element Content of S Polymer and the Characteristics of Lead-Acid Battery>

Figure 7:
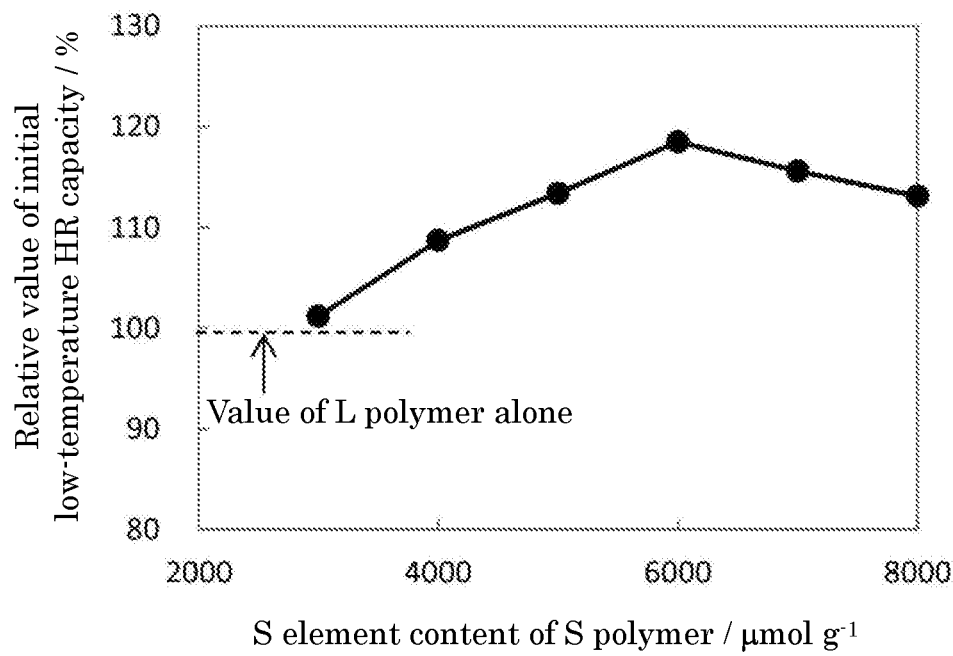
FIG. 7 is a characteristic chart showing the relationship between the S element content of an S polymer and the initial low-temperature high-rate capacity.
Figure 8:
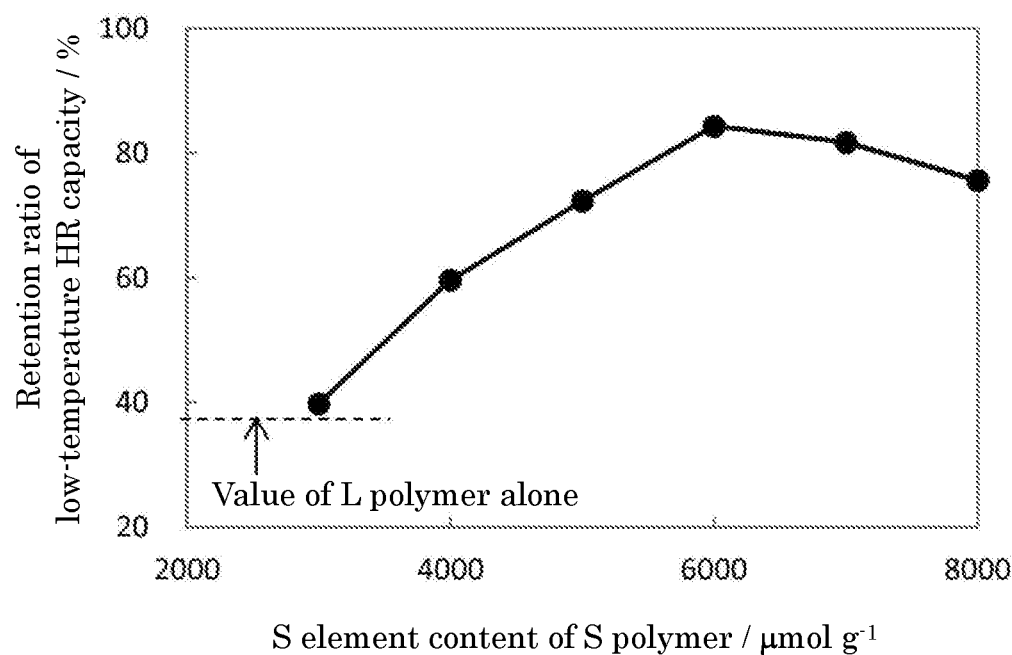
FIG. 8 is a characteristic chart showing the relationship between the S element content of an S polymer and the retention ratio of a low-temperature high-rate capacity.
Figure 9:
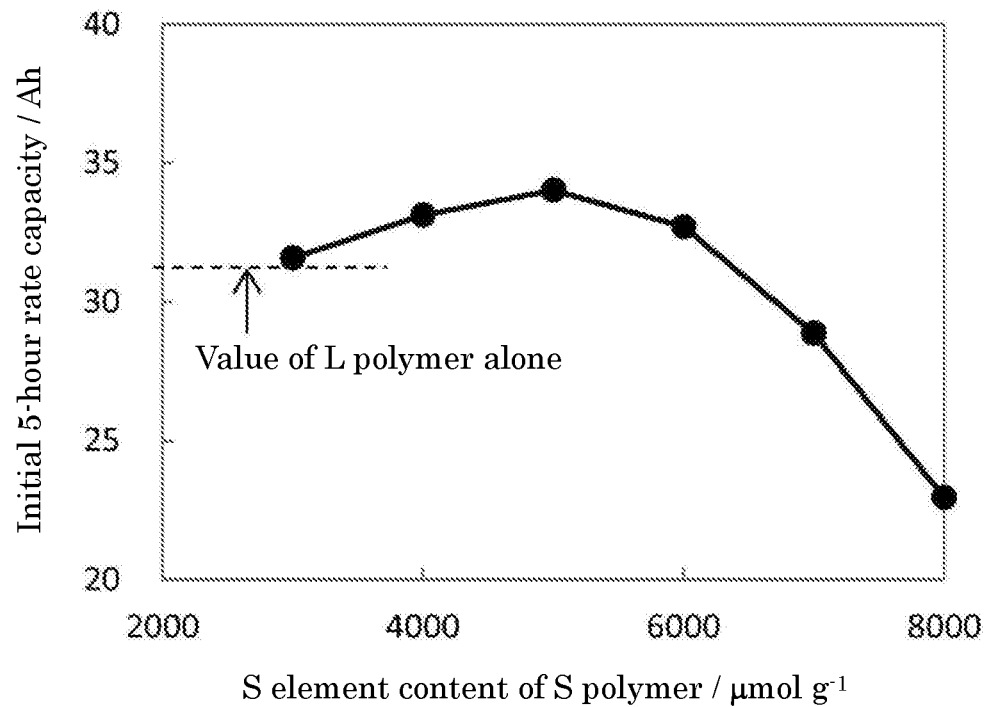
FIG. 9 is a characteristic chart showing the relationship between the S element content of an S polymer and the initial 5-hour rate capacity.

The content of the organic expander was fixed to 0.2 mass %, the S element content of the L polymer (lignin sulfonic acid) was fixed to 500 μmol/g, the active material density was fixed to 3.5 g/cm$^3$, and the content of the L polymer in the organic expander was fixed to 5 mass %. The changes in the characteristics of a lead-acid battery were shown in Table 7 and FIGS. 7 to 9 when the S element content of the S polymer including bisphenols sulfonic acid was changed. When the S element content of the S polymer was 4000 µmol/g or more, the characteristics are largely improved, when the S element content was 6000 µmol/g, both of the initial low-temperature high-rate capacity (FIG. 7) and the retention ratio of a low-temperature high-rate capacity (FIG. 8) reached the maximum, and when the S element content exceeded 6000 µmol/g, the initial 5-hour rate capacity (FIG. 9) was sharply decreased. From these things, the S element content of the S polymer is set to 3000 µmol/g or more at which the performance higher than that of the L polymer alone is obtained, and set to preferably 4000 µmol/g or more. Further, the S element content of the S polymer is set to more preferably 6000 µmol/g or less, and most preferably 4000 µmol/g or more and 6000 µmol/g or less.

TABLE 7

S element content of S polymer contained in organic expander and results of each measurement (L polymer content was 5%)

| Results of each measurement | Organic polymer species | | | | | | |
|---|---|---|---|---|---|---|---|
| | Bisphenols sulfonic acid polymer | | | | | | L polymer * alone |
| S element content of S polymer/µmol g$^{-1}$ | 3000 | 4000 | 5000 | 6000 | 7000 | 8000 | — |
| Organic expander content/% | 0.2 | ← | ← | ← | ← | ← | ← |
| S element content of L polymer/µmol g$^{-1}$ | 500 | ← | ← | ← | ← | ← | — |
| Active material density/g cm$^{-3}$ | 3.5 | ← | ← | ← | ← | ← | ← |
| Content of L polymer in mixed organic expander/% | 5 | ← | ← | ← | ← | ← | — |
| Relative value of initial low-temperature HR capacity/% | 101.2 | 108.7 | 113.4 | 118.5 | 115.6 | 113.1 | 100 |
| Retention ratio of low-temperature HR capacity/% | 39.8 | 59.6 | 72.3 | 84.3 | 81.7 | 75.6 | 38.7 |
| Initial 5-hour rate capacity/Ah | 31.57 | 33.12 | 34.02 | 32.70 | 28.87 | 22.95 | 31.3 |

* L polymer: lignin sulfonic acid having S element content of 500 µmol g$^{-1}$

<Relationship Between the Content of L Polymer and the Characteristics of Lead-Acid Battery>

Tables 8 to 10 show the relationship between the content of the L polymer and the characteristics of a lead-acid battery, Table 8 shows the results when the lignin sulfonic acid having an S element content of 5000 µmol/g was used as the S polymer, Table 9 shows the results when the bisphenols sulfonic acid having an S element content of 5000 µmol/g was used as the S polymer, and Table 10 shows the results when the naphthalene sulfonic acid having an S element content of 5000 µmol/g was used as the S polymer. In any case, the content of the organic expander was set to 0.2 mass %, the L polymer was lignin sulfonic acid, the S element content was set to 500 µmol/g, and the active material density was set to 3.5 g/cm$^3$.

Figure 10:
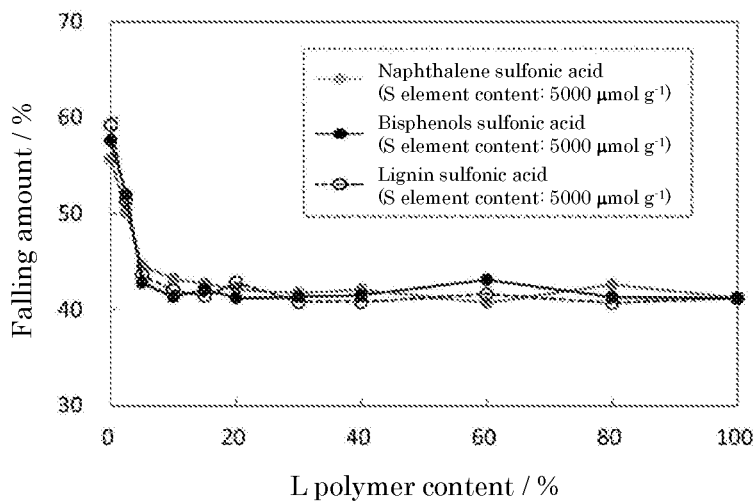
FIG. 10 is a characteristic chart showing the relationship between the L polymer content and the falling amount of a positive electrode material.
Figure 11:
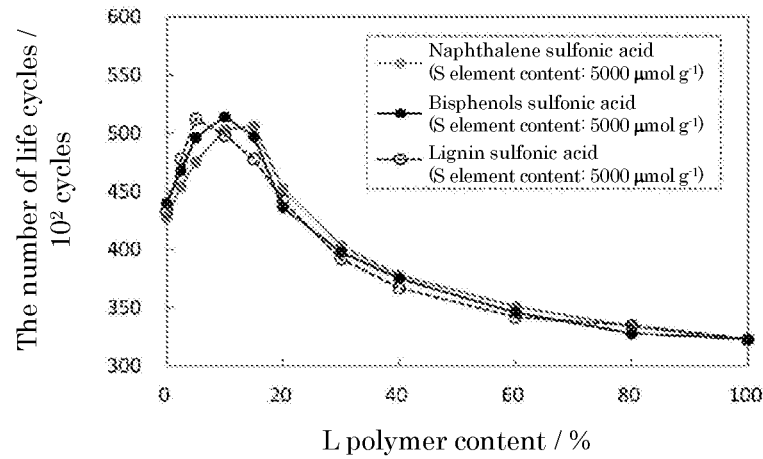
FIG. 11 is a characteristic chart showing the relationship between the L polymer content and the number of lifetime cycles.
Figure 12:
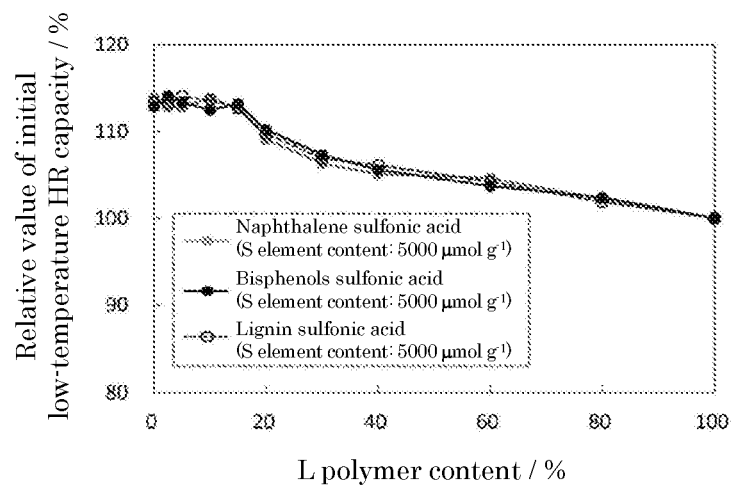
FIG. 12 is a characteristic chart showing the relationship between the L polymer content and the initial low-temperature high-rate capacity.
Figure 13:
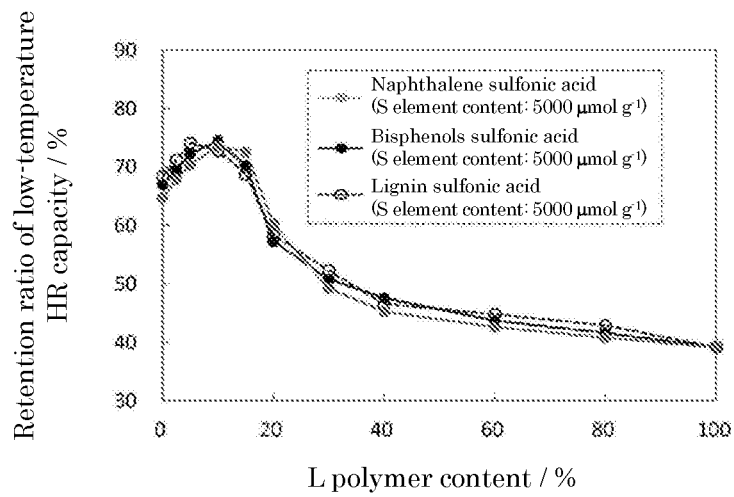
FIG. 13 is a characteristic chart showing the relationship between the L polymer content and the retention ratio of a low-temperature high-rate capacity.
Figure 14:
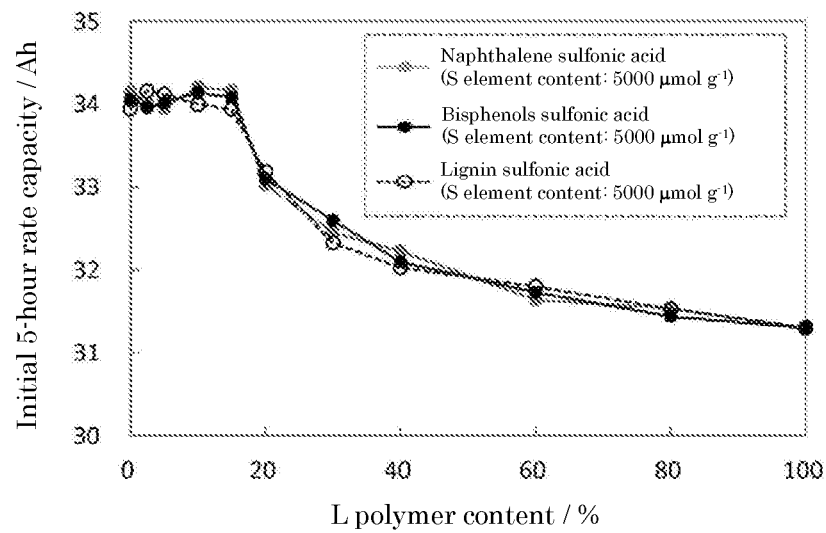
FIG. 14 is a characteristic chart showing the relationship between the L polymer content and the initial 5-hour rate capacity.

The relationship between the L polymer content and the falling amount of a positive active material is shown in FIG. 10, the relationship with the number of life cycles is shown in FIG. 11, the relationship with the initial low-temperature high-rate capacity is shown in FIG. 12, the relationship with the retention ratio of a low-temperature high-rate capacity is shown in FIG. 13, and the relationship with the initial 5-hour capacity is shown in FIG. 14. The influence of a base material of the S polymer was small, and the number of life cycles and the retention ratio of a low-temperature high-rate capacity showed unique peaks when the content of the L polymer was 5 mass % or more and 15 mass % or less. The falling amount of the positive active material was decreased when the content of the L polymer was 5 mass % or more, and the initial low-temperature high-rate capacity and the initial 5-hour rate capacity were increased when the content of the L polymer was 15 mass % or less.

TABLE 8

L polymer content and results of each measurement when lignin sulfonic acid is used as the S polymer contained in organic expander

| Results of each measurement | L polymer content/% | | | | | | | | | | |
|---|---|---|---|---|---|---|---|---|---|---|---|
| | 0 | 2.5 | 5 | 10 | 15 | 20 | 30 | 40 | 60 | 80 | 100 |
| S element content of S polymer/μmol g$^{-1}$ | 5000 | ← | ← | ← | ← | ← | ← | ← | ← | ← | ← |
| Organic expander content/% | 0.2 | ← | ← | ← | ← | ← | ← | ← | ← | ← | ← |
| S element content of L polymer/μmol g$^{-1}$ | 500 | ← | ← | ← | ← | ← | ← | ← | ← | ← | ← |
| Active material density/ g cm$^{-3}$ | 3.5 | ← | ← | ← | ← | ← | ← | ← | ← | ← | ← |
| Falling amount/% | 59.2 | 51.4 | 43.6 | 42.0 | 41.4 | 42.8 | 40.8 | 40.8 | 41.6 | 40.7 | 41.2 |
| The number of life cycles | 433 | 478 | 512 | 498 | 478 | 442 | 392 | 367 | 342 | 335 | 323 |
| Relative value of initial low-temperature HR capacity/% | 113.4 | 113.2 | 114.0 | 113.6 | 112.7 | 109.7 | 106.9 | 106.1 | 104.2 | 101.9 | 100.0 |
| Retention ratio of low-temperature HR capacity/% | 68.4 | 71.2 | 74.1 | 72.8 | 68.7 | 58.4 | 52.3 | 46.6 | 44.8 | 42.9 | 39.2 |
| Initial 5-hour rate capacity/Ah | 33.95 | 34.16 | 34.12 | 34.00 | 33.94 | 33.18 | 32.33 | 32.03 | 31.80 | 31.53 | 31.30 |

TABLE 9

L polymer content and results of each measurement when bisphenols sulfonic acid is used as the S polymer contained in organic expander

| Results of each measurement | L polymer content/% | | | | | | | | | | |
|---|---|---|---|---|---|---|---|---|---|---|---|
| | 0 | 2.5 | 5 | 10 | 15 | 20 | 30 | 40 | 60 | 80 | 100 |
| S element content of S polymer/μmol g$^{-1}$ | 5000 | ← | ← | ← | ← | ← | ← | ← | ← | ← | ← |
| Organic expander content/% | 0.2 | ← | ← | ← | ← | ← | ← | ← | ← | ← | ← |
| S element content of L polymer/μmol g$^{-1}$ | 500 | ← | ← | ← | ← | ← | ← | ← | ← | ← | ← |
| Active material density/ g cm$^{-3}$ | 3.5 | ← | ← | ← | ← | ← | ← | ← | ← | ← | ← |
| Falling amount/% | 57.6 | 52.0 | 42.8 | 41.3 | 42.1 | 41.2 | 41.3 | 41.5 | 43.1 | 41.3 | 41.2 |
| The number of life cycles/ 10$^2$ cycles | 440 | 468 | 496 | 514 | 497 | 436 | 398 | 375 | 346 | 328 | 323 |
| Relative value of initial low-temperature HR capacity/% | 112.8 | 114.1 | 113.4 | 112.5 | 113.2 | 110.2 | 107.3 | 105.6 | 103.7 | 102.4 | 100.0 |
| Retention ratio of low-temperature HR capacity/% | 67.0 | 69.4 | 72.3 | 74.5 | 70.2 | 57.3 | 50.8 | 47.6 | 43.7 | 41.6 | 39.2 |
| Initial 5-hour rate capacity/Ah | 34.05 | 33.96 | 34.02 | 34.14 | 34.08 | 33.10 | 32.60 | 32.10 | 31.73 | 31.44 | 31.30 |

TABLE 10

L polymer content and results of each measurement when naphthalene sulfonic acid is used as the S polymer contained in organic expander

| Results of each measurement | L polymer content/% | | | | | | | | | | |
|---|---|---|---|---|---|---|---|---|---|---|---|
| | 0 | 2.5 | 5 | 10 | 15 | 20 | 30 | 40 | 60 | 80 | 100 |
| S element content of S polymer/μmol g$^{-1}$ | 5000 | ← | ← | ← | ← | ← | ← | ← | ← | ← | ← |
| Organic expander content/% | 0.2 | ← | ← | ← | ← | ← | ← | ← | ← | ← | ← |
| S element content of L polymer/μmol g$^{-1}$ | 500 | ← | ← | ← | ← | ← | ← | ← | ← | ← | ← |
| Active material density/ g cm$^{-3}$ | 3.5 | ← | ← | ← | ← | ← | ← | ← | ← | ← | ← |

TABLE 10-continued

L polymer content and results of each measurement when naphthalene sulfonic acid is used as the S polymer contained in organic expander

| Results of each measurement | L polymer content/% | | | | | | | | | | |
|---|---|---|---|---|---|---|---|---|---|---|---|
| | 0 | 2.5 | 5 | 10 | 15 | 20 | 30 | 40 | 60 | 80 | 100 |
| Falling amount/% | 55.7 | 50.2 | 44.6 | 43.2 | 42.7 | 42.1 | 41.7 | 42.1 | 40.7 | 42.6 | 41.2 |
| The number of life cycles/ $10^2$ cycles | 428 | 454 | 475 | 503 | 506 | 452 | 403 | 378 | 351 | 334 | 323 |
| Relative value of initial low-temperature HR capacity/% | 113.8 | 112.8 | 112.8 | 113.8 | 112.7 | 109.1 | 106.3 | 105.1 | 104.6 | 102.2 | 100.0 |
| Retention ratio of low-temperature HR capacity/% | 64.8 | 67.9 | 70.4 | 73.6 | 72.6 | 60.3 | 49.3 | 45.3 | 42.6 | 40.8 | 39.2 |
| Initial 5-hour rate capacity/Ah | 34.15 | 34.01 | 33.95 | 34.21 | 34.16 | 33.03 | 32.45 | 32.23 | 31.64 | 31.54 | 31.30 |

<Relationship Between the Density of Negative Electrode Material and the Elution Amount of Organic Expander>

Figure 15:
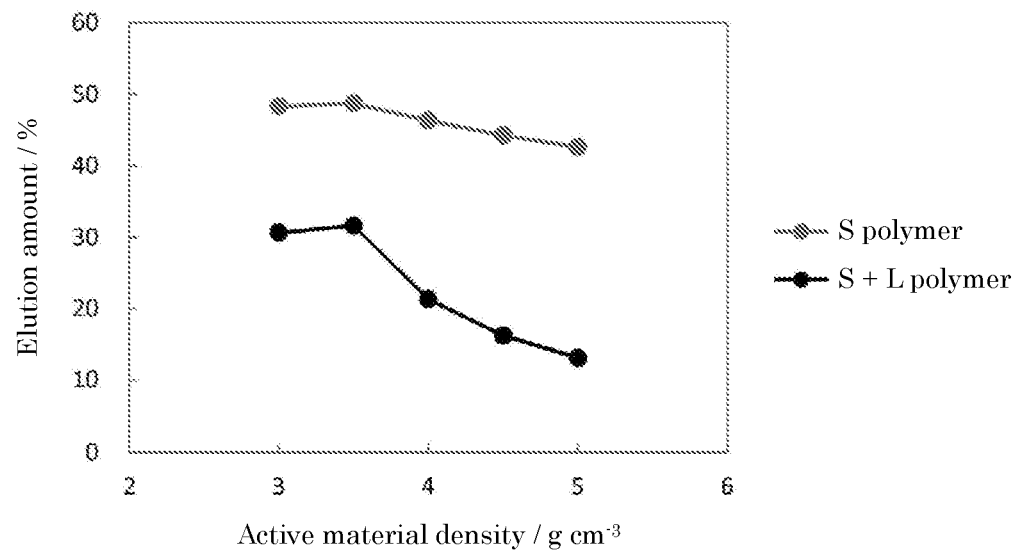
FIG. 15 is a characteristic chart showing the relationship between the density of a negative electrode material and the elution amount of a negative electrode material, and the content of an organic expander is 0.2 mass %, and the L polymer content is 5%.

When the S polymer and the L polymer were used together, the unique influence of the active material density was observed as compared with the S polymer alone. The results are shown in Table 11 and FIG. 15. The content of the organic expander was fixed to 0.2 mass %, the S polymer was bisphenols sulfonic acid having an S element content of 5000 μmol/g, the L polymer was lignin sulfonic acid having an S element content of 500 μmol/g, and the content of the L polymer in the organic expander was 5 mass %. When the density of the negative active material exceeded 3.5 g/cm$^3$, the elution amount of the organic expander was decreased. Although the data are not shown, the falling amount of the negative active material, the retention ratio of the low-temperature high-rate capacity, the number of life cycles, and the like are improved. The density of the negative active material is preferably 3.8 g/cm$^3$ or more, and more preferably 4.0 g/cm$^3$ or more. Further, the density of the negative active material is more preferably 5.0 g/cm$^3$ or less.

TABLE 11

Relationship between the active material density and the elution amount of organic expander

| Results of each measurement | Organic polymer species* | | | | | | | | | |
|---|---|---|---|---|---|---|---|---|---|---|
| | S polymer | | | | | S + L polymer | | | | |
| Organic expander content/% | 0.2 | ← | ← | ← | ← | ← | ← | ← | ← | ← |
| Active material density/g cm$^{-3}$ | 3 | 3.5 | 4 | 4.5 | 5 | 3 | 3.5 | 4 | 4.5 | 5 |
| Elution amount/% | 48.3 | 48.7 | 46.3 | 44.2 | 42.6 | 30.6 | 31.6 | 21.3 | 16.2 | 13.1 |

*S polymer: bisphenols sulfonic acid having an S element content of 5000 μmol g$^{-1}$, and L polymer: lignin sulfonic acid having an S element content of 500 μmol g$^{-1}$
S + L polymer: mixture of the above-described S polymer and L polymer (L polymer content was 5%).

In Examples, the measurement of each of the S element content of the organic expander in a negative electrode material (hereinafter simply referred to as "S element content") and the density of the negative active material (negative electrode material) was performed according to the measurement method described above.

The lead-acid battery can be implemented in the following manner.

1. A lead-acid battery, in which a mass ML1 of a L polymer and a mass MS1 of a S polymer, which are measured from a negative electrode plate of the lead-acid battery by the following procedures, satisfy 0.05≤ML1/(ML1+MS1)≤0.15, procedures: after fully charged, insoluble components are removed by filtration from a solution obtained by immersing and dissolving a negative electrode material separated from a negative electrode plate from which sulfuric acid components have been removed by water washing in a 1 mol/L NaOH aqueous solution at 40° C. for 48 hours, the solution is passed through a column and desalted, and the desalted solution is fractionated, an absorbance A350 at a wavelength of 350 nm and an absorbance A300 at a wavelength of 300 nm of each of fractionated components are measured, and $ML1$=(total mass of fractionated components of $A350/A300>0.5$), and $MS1$=(total mass of fractionated components of $A350/A300≤0.5$) are set.

2. In the lead-acid battery described in "1.",
    the S polymer has an S element content of 3000 μmol/g or more.
3. In the lead-acid battery described in "1." or "2.",
    the S polymer has an S element content of 4000 μmol/g or more.
4. In the lead-acid battery described in any one of "1." to "3.",
    the S polymer has an S element content of 6000 μmol/g or less.

The invention claimed is:

1. A lead-acid battery, comprising:
   a negative electrode material containing an organic expander, in a negative electrode plate,
   wherein the organic expander contains:
   an S polymer having an aromatic ring and having an S element content of 3000 μmol/g or more; and
   an L polymer having an aromatic ring and having an S element content of 2000 μmol/g or less, and
   wherein a mass MS1 of the S polymer and a mass ML1 of the L polymer satisfy $$0.05 \leq ML1/(ML1+MS1) \leq 0.15,$$

wherein the mass ML1 of the L polymer and the mass MS1 of the S polymer, which are measured from the negative electrode plate of the lead-acid battery by a following procedures,
   the procedures: after fully charged, insoluble components are removed by filtration from a solution obtained by immersing and dissolving a negative electrode material separated from a negative electrode plate from which sulfuric acid components have been removed by water washing in a 1 mol/L NaOH aqueous solution at 40° C. for 48 hours,
   the solution is passed through a column and desalted, and the desalted solution is fractionated,
   an absorbance A350 at a wavelength of 350 nm and an absorbance A300 at a wavelength of 300 nm of each of fractionated components are measured, and $$ML1 = \text{(total mass of fractionated components of } A350/A300 > 0.5\text{), and}$$

$$MS1 = \text{(total mass of fractionated components of } A350/A300 \leq 0.5\text{) are set.}$$

2. The lead-acid battery according to claim 1, wherein the S polymer has an S element content of 4000 μmol/g or more.

3. The lead-acid battery according to claim 1, wherein the S polymer has an S element content of 6000 μmol/g or less.

4. The lead-acid battery according to claim 3, wherein the S polymer has an S element content of 4000 μmol/g or more and 6000 μmol/g or less.

5. The lead-acid battery according to claim 1, wherein the negative electrode material has a density of 3.8 g/cm³ or more.

6. The lead-acid battery according to claim 5, wherein the negative electrode material has a density of 4.0 g/cm³ or more.

* * * * *